United States Patent [19]

Boone et al.

[11] Patent Number: 4,476,541
[45] Date of Patent: * Oct. 9, 1984

[54] VARIABLE FUNCTION PROGRAMMED SYSTEM

[75] Inventors: Gary W. Boone; Michael J. Cochran, both of Houston, Tex.

[73] Assignee: Texas Instruments Incorporated, Dallas, Tex.

[*] Notice: The portion of the term of this patent subsequent to Feb. 14, 1995 has been disclaimed.

[21] Appl. No.: 358,996

[22] Filed: Mar. 17, 1982

Related U.S. Application Data

[60] Division of Ser. No. 002,814, Jan. 12, 1979, Pat. No. 4,326,265, which is a division of Ser. No. 856,932, Dec. 2, 1977, Pat. No. 4,242,675, which is a continuation of Ser. No. 420,999, Dec. 3, 1973, abandoned, which is a continuation of Ser. No. 163,565, Jul. 19, 1971, abandoned.

[51] Int. Cl.³ .................. G06F 3/02; G06F 3/147; G06F 9/00; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 2,989,729 | 6/1961 | Schafer | 340/147 |
| 3,036,773 | 5/1962 | Brown | 364/200 |
| 3,566,153 | 2/1971 | Spencer | 307/205 |
| 3,593,313 | 7/1971 | Tomaszewski et al. | 340/172.5 |
| 3,745,536 | 7/1973 | Klehm | 340/172.5 |
| 3,760,375 | 9/1973 | Irwin et al. | 340/172.5 |
| 3,800,129 | 3/1974 | Umstattd | 235/156 |
| 3,859,635 | 1/1975 | Watson et al. | 340/172.5 |

OTHER PUBLICATIONS

Reference Manual-IBM 7090 Data Processing System-Aug. '61-A22-6528-3; pp. 6, 7, 8, 9 and 74.
Electronic News, Feb. 1, 1971, p. 25; Feb. 8, 1971, p. 38.
Electronic Design, Feb. 18, 1971, p. 34.
Japan Electronic Engineering, Mar. 1971, pp. 66-67.
EEE (Electronic Equipment Engineering), Mar. 1971, p. 28.
IEEE Digest, Mar. 1970, p. 285.
Japan Electronic Engineering, Mar. 1970, pp. 24-29.
ISSCC, 1968, (International Solid-State Circuits Conference), pp. 46-47.
Instrument Society of America; "Progress in Direct Digital Control"; Pittsburgh, 1969; Larsen et al.; pp. 158-164; A User-Designed Operator Console.
Electronic Engineering, Sep. 1970, p. 96.
Electronics, Jul. 20, 1970, pp. 122-123.
IBM Technical Disclosure Bulletin, Jan. 1965, pp. 666-668.
IEEE Trans. on Computers, Mar. 1970, pp. 213-222.
MOS Keyboard Encoders, Report No. 03-70-131, 1970, Pub. by Texas Instruments.
64-Key Dynamic Keyboard Encoder, Report No. 03-70-132, 1970, Published by Texas Instruments.
Electronics, Jun. 7, 1971, pp. 36-37.

*Primary Examiner*—Harvey E. Springborn
*Attorney, Agent, or Firm*—John G. Graham

[57] ABSTRACT

A variable function calculator utilizes a fixed program memory array such as a programmed read only memory in which a number of programs are stored depending upon the desired functions of the calculator. The calculator also includes a program counter, an instruction register, control decoders, jump-condition circuits, a clock generator, a timing generator, decoders, key input logic, a data storage array, an arithmetic logic unit, an output decoder, and a digit scanner which scans both the keyboard and display outputs. Aside from providing basic desk top calculator functions, the read only memory may be programmed so that the system provides metering functions, arithmetic teaching functions, control functions, etc. A preferred embodiment of the invention is capable of being fabricated as a monolithic integrated semiconductor system utilizing contemporary metal-insulator-semiconductor techniques.

2 Claims, 17 Drawing Figures

VARIABLE FUNCTION PROGRAMMED SYSTEM

This is a division of application Ser. No. 002,814, filed Jan. 12, 1979, now U.S. Pat. No. 4,326,265 issued 04/20/1982, which was a division of application Ser. No. 856,932, filed Dec. 2, 1977, now U.S. Pat. No. 4,242,675, issued Dec. 30, 1980, which was a continuation of application Ser. No. 420,999, filed Dec. 3, 1973, now abandoned, which was a continuation of application Ser. No. 163,565, filed July 19, 1971, now abondoned.

This invention relates to calculators and, more particularly, to a variable function fixed program calculator capable of being fabricated as a monolithic integrated semiconductor system utilizing contemporary semiconductor technology.

It is an object of the present invention to provide a system which functions as a basic desk top calculator. More particularly, it is an object of the invention to provide such calculator function including primitive decimal operations, such as add, subtract, multiply and divide with floating decimal point entry and either floating or fixed decimal point results on multi-digit operands. This object is accomplished in accordance with the present invention by providing, for example, a dynamic charge storage random access memory shifting array for registration of numeric and control data. The calculator includes a control memory such as a programmable logic array (PLA), a program memory such as a read only memory (ROM) and means for performing arithmetic and logic modification of registered data including binary coded decimal (BCD), bit-parallel digit-serial decimal arithmetic, and set-reset-toggle (SRT) FLAG data modification.

Another object of the invention is to provide a calculator system which is capable of being fabricated as a monolithic integrated semiconductor system. More particularly, it is an object of the invention to provide such calculator system which is capable of being fabricated as a monolithic integrated metal-insulator-semiconductor system utilizing contemporary metal-insulator-semiconductor technology. This object is accomplished in accordance with the present invention by providing a random access memory shift register system which requires approximately one-third the area of conventional shift register systems, providing internal generation of multiphase clocks from a single phase input clock which is included in the calculator but which is external to the monolithic structure and by providing a common programmed scanning system in the monolithic structure to provide both keyboard encoding and display decoding with minimum external connections between the monolithic system and the keyboard and display. The total number of connections from the monolithic structure to other calculator subsystems such as the keyboard, display and power supply are therefore minimized so that the monolithic structure is capable of being packaged in a conventional twenty-eight or forty pin package.

It is a further object of the present invention to provide a versatile calculator system in which the calculator function and input and output interfaces can be varied without changing the basic calculator structure, and particularly without changing the basic calculator structure as an integrated semiconductor system. This object is accomplished with the present invention by providing a programmable read only memory which provides a fixed program for the calculator system in accordance with the desired function of the calculator system and by providing programmable logic arrays for decoding and encoding the input, output and operating data by masking such data to any desired format. The programmable read only memory and the programmable logic arrays are easily modified by changing only the gate-insulator mask for the metal-insulator-semiconductor integrated system embodiment during the fabrication process.

Yet another object of the invention to provide a calculator with improved means for encoding keyboard commands and status information and which also functions as a direct interface means between a display decoder and a display for segmented and/or individual-decimal-numerical displays. This object is accomplished in accordance with the invention by providing a programmed scanning system to service both the keyboard input and display output, thereby minimizing hardware requirements for the key input system. Four keyboard input pins combine with eleven scanner output pins to allow a total of forty-four distinct keys and/or switches. The programmed routine residing in the read-only memory encodes the input from the keyboard array under program control. The scanning system operates at a slow enough rate to eliminate the need for any external keyboard drive circuitry and allows direct drive of large capacitance loads with response consistent to the scan rate. The scan program includes an encoding routide to effectively defeat transient noise and key bounce types of interference from the keyboard. An additional advantage of the keyboard scanning system then is that it requires few diodes, no amplifiers and simple switches which need not be low resistance or low bounce time switches. The display output includes internal segment or digit decoding, digit-blanking and zero suppression logic and utilizes the same scanning system as the keyboard. The display itself may be comprised or light-emitting diodes, liquid crystal, cold cathode gas discharge display elements, fluorescent display elements, multi-digit single-envelope cold-cathode gas-discharge tubes, incandescent display elements, etc. The multiple display capability is provided by the generally defined digit scanning and segment or numeral decoding system and by providing for an inter-digit blanking signal which is variable in terms of leading and trailing edge blanking intervals and in terms of its application to either the segment drivers or the digit drivers or both. The output decoder is comprised of a programmable logic array segment decoder circuit which can be programmed to accommodate any seven, eight, nine, ten segment or ten digit numerical display font plus a right or left decimal point. In this manner the calculator system of the present invention is essentially insensitive to the selection of a display which is utilized in conjunction with it.

It is still a further object of the invention to provide internal means for suppression of insignificant leading zeros in the calculator display. This object is accomplished by the programmed scanning system which provides scanning of the most significant output digits first and minimizes hardware means for detecting and suppression leading zeros.

Another object of the invention is to allow both constant-operand and chained-intermediate-result type of calculations in a fully algebraic manner. This object is accomplished by providing an operator selectable control or mode switch to distinguish the constant-operand mode from the chained-intermediate-result mode of operation and by providing a fixed program decision routine in the read only memory array to detect the desired mode and effect it.

It is yet a further object of the invention to provide a calculator system which includes means for providing an automatic round-off solution for high accuracy in calculation. This object is accomplished in accordance with the present invention by utilizing a fixed program routine stored in the read only memory which adds the numeral five to the least significant digit which is to be lost. In this manner, a one is added to the second least significant digit which is to be kept when the least significant digit which is to be lost is greater than or equal to five.

Another object of the invention is to provide a calculator system with minimum power dissipation in order to provide a uniquely portable desk top calculator with good battery life. This object is accomplished in accordance with the present invention by provision of special control circuits to turn off dissipating functional elements except when such functional elements are actually being used and by provision of special pre-charge ratioless circuits within an metal-insulator-semiconductor embodiment of the read only memory, programmable logic array and arithmetic logic unit functional subsystems. For example, the instruction output from the read only memory need be detected only one per instruction cycle; a power control is applied to the read only memory decoder effecting a duty cycle of 2/13ths of the nominal static power dissipation to eliminate DC currents so that only transient $CV^2f$ power is dissipated.

Still further objects and advantages of the invention will be apparent from the following detailed description and claims and from the accompanying drawings illustrative of the invention wherein:

According to the present invention a variable function programmed calculator which includes a fixed program stored in a read only memory is capable of being fabricated as a monolithic integrated semiconductor system. In particular, the described embodiment is capable of being fabricated as a monolithic integrated metal-insulator-semiconductor system utilizing contemporary metal-insulator-semiconductor-technology. The calculator system may be programmed to perform desk top calculator functions including floating decimal point operation or may be programmed to perform other useful operations. A monolithic structure of the calculator system includes a fixed program which is programmed in the programmable read only memory by modifying one of five or seven masks (the gate-insulator mask) during the fabrication process. In addition, the input, output and operating format of data within the calculator system is programmable in programmable logic arrays by altering the same masks. In the following sections the calculator system is first described in terms of the functional relationship between its various subsystems, then in terms of specific circuits and finally in terms of the fixed programs stored in the read only memory.

FUNCTIONAL DESCRIPTION OF THE CALCULATOR SYSTEM

Figure 1:
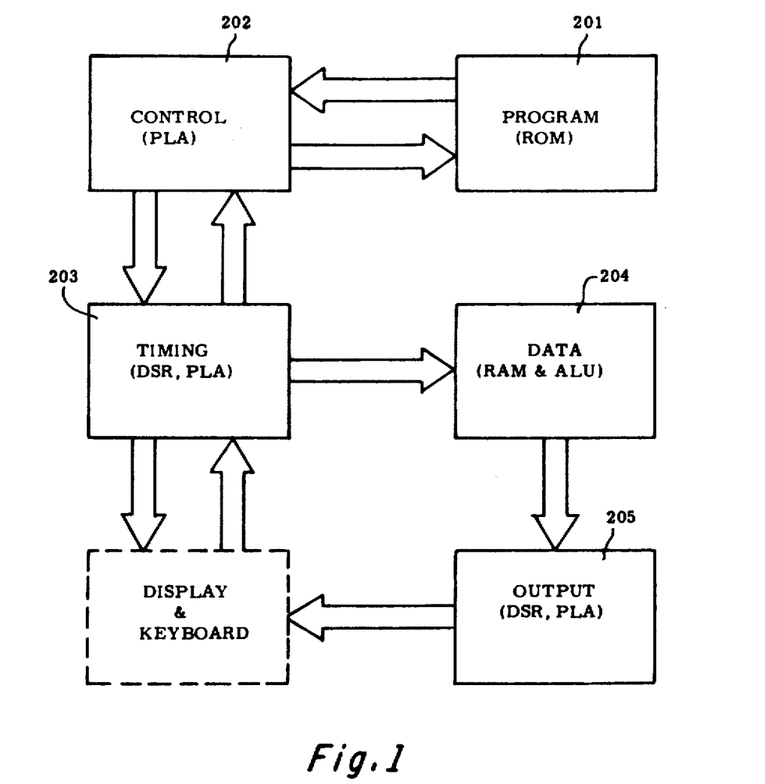
FIGS. 1 and 2 are block diagrams illustrating the calculator system of the present invention.
Figure 2:
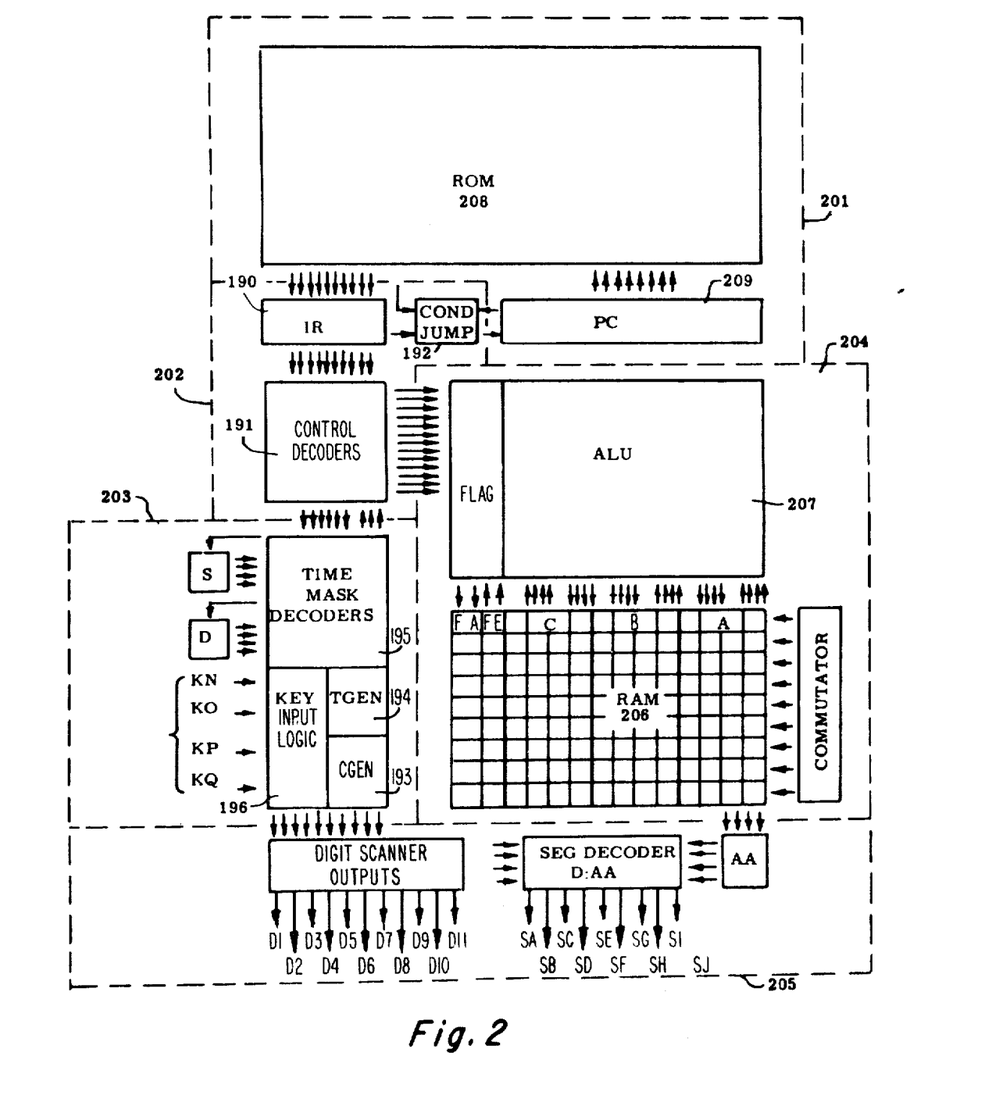

Referring to FIGS. 1 and 2, the calculator system of the present invention is illustrated in terms of the functional dependence among five internal functional subsystems of the calculator system and the relation between the internal functional subsystems and external functional elements. Program block 201 comprises a read only memory (ROM) 208 for storing fixed programs to operate the calculator in a desired manner and program counter (PC) 209. Control block 202 comprises instruction register (IR) 190 for storing a control instruction, control decoders 191 for decoding control instructions and jump condition circuit 192. Timing block 203 comprises a clock generator 143, a timing generator 194, digit and FLAG mask decoders 195, and key input logic 196. Data block 204 comprises random access memory shift register system and FLAG data storage array 206, decimal arithmetic unit 207 and FLAG logic unit 229. Output block 205 comprises segment output decoder 198 and digit scanner outputs 197.

DATA BLOCK 204

Figure 3:
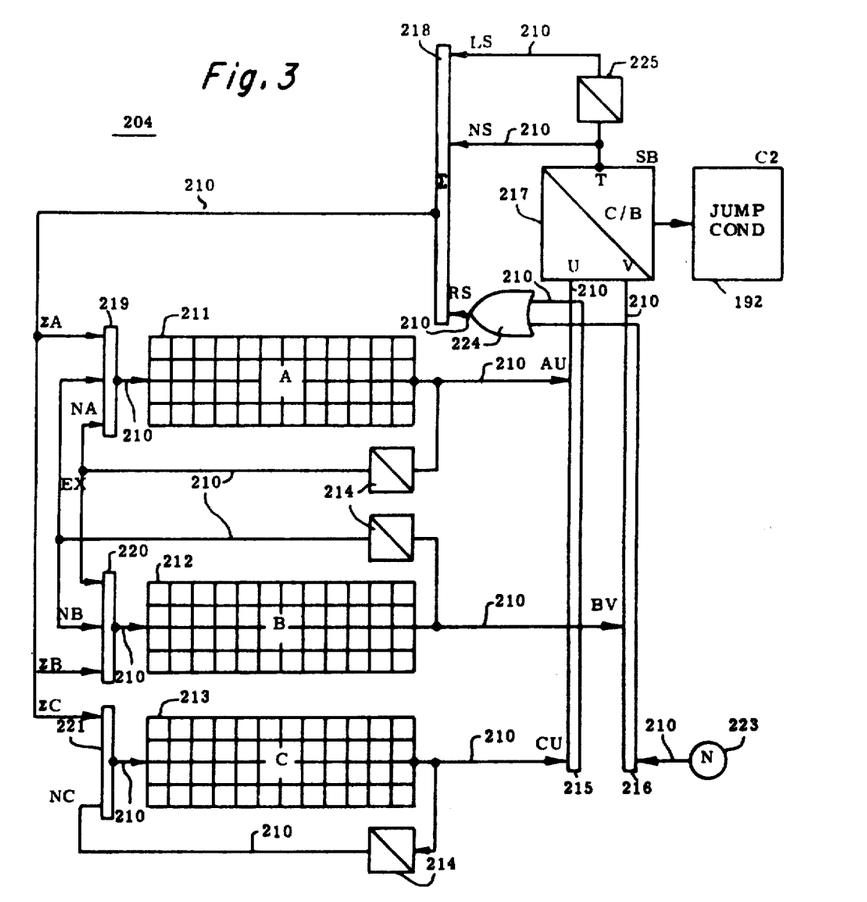
FIG. 3 is a block diagram functionally describing data block 204 of one embodiment of the calculator system of the invention.

Referring to FIG. 3, a functional description of data block 204 is described in detail. Data block 204 includes means for providing decimal or hexadecimal data storage and means for providing basic operations. The storage structure of the present embodiment is parallel for decimal or hexadecimal digits; therefore, each interconnect 210 coupling the various functional elements symbolize four physical interconnections. A register 211, B register 212 and C register 213 of memory array shift register system 206 comprise the primary decimal or hexadecimal storage means for the calculator logic unit. 1-bit dynamic shift register delay circuits 214 are utilized to provide recirculating refresh of primary registers 211, 212 and 213. The outputs of A register 211 and C register 213 are input to the U selector 215. The output of B register 212 and a constant N provided by means 223 are input to V selector 216. A binary or binary coded decimal (BCD) adder 217 calculates the sum or difference between U and V, i.e., U+V or U−V. U is the plus side of the adder; V is the minus side of the adder. A Σ data selector 218 provides means for short and long path shifting operations. An output from adder 217 to an input of Σ data selector 218 corresponds to the normal path in which no shift is provided. The delay adder input 225 to Σ data selector 218 corresponds to the long path in which a left shift is provided. The UV logical OR-gate 224 input to Σ data selector 218 corresponds to a short path which provides for a right shift. Data selector 219 selects the input to A register 211 as either the Σ output of Σ data selector 218 or the delayed B register 212 output or the delayed A register output. Data selector 220 selects the input to the B register as either the Σ output of Σ data selector 218 or the delayed A register 211 output of the delayed B register 212 output. Data selector 221 selects the input to the C register as either the Σ output of Σ data selector 218 or the delayed C register 213 output. Jump condition latch circuit 192 is loaded with the carry-borrow output of adder 217.

A register 211, B register 212 and C register 213 each provide dynamic recirculating storage for thirteen decimal or hexadecimal digits in the present embodiment. Adder 217, U data selector 215, V data selector 216, Σ data selector 218, A data selector 219, B data selector 220 and C data selector 221 provide means for arithmetic and logical modification of the contents of registers 211, 212 and 213 by synchronous operation of selector and adder controls which is henceforth described in detail in the section describing control block 202.

Figure 4:
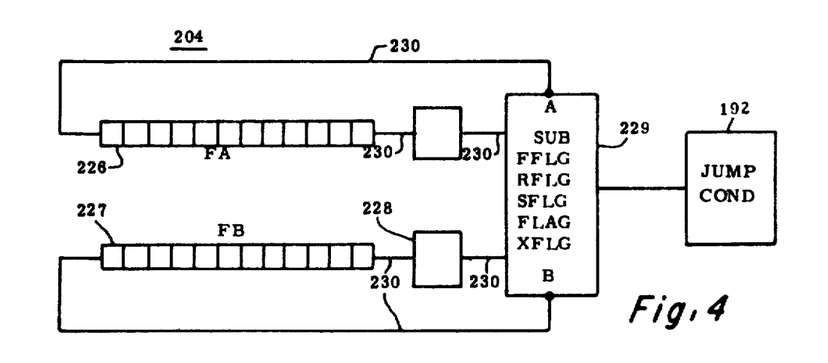
FIG. 4 is a block diagram of the FLAG registers illustrating the operation thereof.

Referring to FIG. 4, the contents of data block 204 is illustrated with respect to 1-bit status or FLAG element storage and operation. The coupling of the functional elements is indicated by interconnects 230. Two 12-bit registers FA register 226 and FB register 227 provide means for storage of status or FLAG information. The outputs of FA register 226 and FB register 227 are delayed by 1-bit by means of dynamic shift register elements 228 before being input to FLAG operation logic unit 229. The A and B outputs of FLAG operation logic unit 229 are coupled to FLAG registers 226 and 227. Operations of FLAG operation logic unit 229 include recirculation, set, reset and toggle of individually addressed FLAGs; and, exchange and compare of FA and FB pairs of FLAGs. Controls SUB, FFLG, RFLG, SFLG, SLAG, and XFLAG are generated to perform the desired operation on a particular addressed FLAG or pair of FLAGs. The operation compare FLAG and the operation test FLAG result in an output from FLAG operation unit 229 to condition circuit 192. The control mechanism for these FLAG operations are henceforth described in detail in the section describing control block 202 below.

CONTROL BLOCK 202

The functions of control block 202 are to accept instruction words from program control block 201, interpret the instruction word and a condition flip-flop as a command word for a subsequent instruction cycle and decode certain controls which operate data selectors and logic units in data block 204, program block 201 and output block 205.

Figure 5:
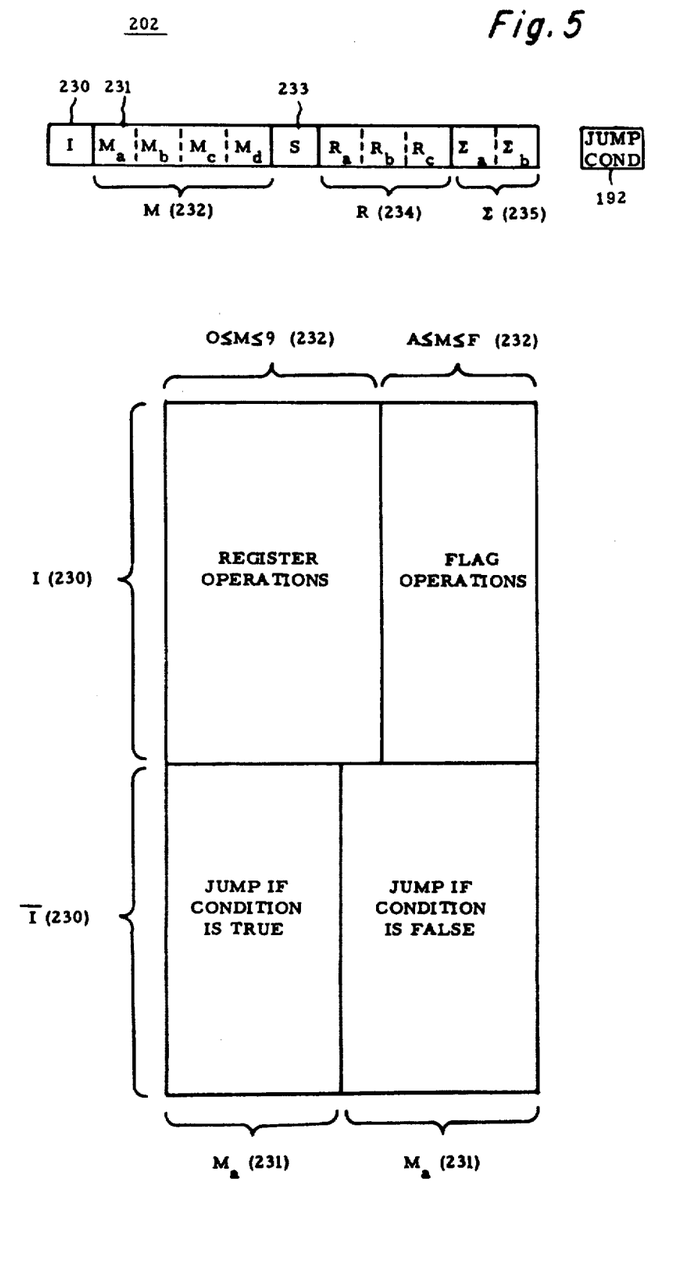
FIG. 5 is a symbolic representation of the basic command word format and instruction map utilized in an embodiment of the calculator system.

The basic command word format and instruction map are illustrated in FIG. 5. Referring to FIG. 5, I-bit 230 distinguishes jump from non-jump instructions. When I-bit 230 is a logical 0, then the instruction is a jump instruction and M-bit 231 distinguishes between true and false conditional jumps while the remaining bits of M field 232, S field 233, R field 234 and Σ field 235 contain the absolute address associated with the jump. When the instruction is a jump instruction (as indicated by a logical 0 being in the I-bit), but the jump condition is not satisfied, then ordinary incrementation of the program counter is effected. When the I-bit is a logical 1, then either a register or a FLAG operation is decoded; the entire M field 232 is used to distinguish register from FLAG operations as detailed in TABLE I of U.S. Pat. No. 4,074,351. When the binary code contained in M field 232 is between 0 and 9, a register operation is decoded; when the binary code contained in M field 232 is between 10 and 15, a FLAG operation is decoded.

In the case of register operations, the 10 codes M=0 through M=9 are used to select one of 6 digit masks in combination with one of 3 constant values (N). The assignment of the 6 masks and 3 constants depends upon the desired data word format. The selections shown in TABLE I are utilized in the programming of a floating point decimal calculator function in accordance with the present invention.

In the case of the FLAG operation, the 6 codes M=10 through M=15 are used to distinguish 6 FLAG codes, that is, compare, exchange, set, reset, toggle and test.

S-bit 233 of the command word controls three functional elements in data block 204. S-bit 233 distinguishes add from subtract in binary or BCD adder 217, distinguishes left shift from right shift in the Σ shift logic and distinguishes A from B in the FLAG operation logic. Add, shift and FLAG operations are exclusive operations and therefore require no further decoding. R field 234 distinguishes among arithmetic, exchange and keyboard input instructions as described in conjunction with TABLE II of U.S. Pat. No. 4,074,351. When the binary value contained in R field 234 is between 1 and 5, an arithmetic operation is indicated and U data selector gate 215 and V data selector gate 216 are controlled to enable the variables indicated in TABLE II as inputs to adder 217. When the binary value contained in R field 234 is equal to 6, an exchange of A and B, without digit masking is enabled, by-passing adder 217 and the Σ gate 218. When the binary value contained in R field 234 is 0 or 7, then an arithmetic no-op (no operation) is indicated, providing means for implementation of a special class of instructions for keyboard synchronization and encoding.

Σ field 235 determines the selection of the output from Σ data selector 218 to A register 211, B register 212, C register 213 or none of these Σ data selector outputs. As shown in TABLE III of U.S. Pat. No. 4,074,351, three codes are decoded to enable the output of Σ data selector 218 to be input to A register 211, B register 212 and C register 213; and the fourth code provides means for a no-op code to enable a class of keyboard synchronization and encoding instructions.

Condition circuit 192 reflects the status of the calculator at any given point in the execution of its fixed program. It is combined with the contents of Ma-bit 231 to determine if a jump instruction is to be executed or skipped. Condition circuit 192 is loaded with a carry-borrow (C/B) result of an arithmetic operation, the contents of any FLAG test or comparison (FA:FB) of any pair of FLAGs with a common (FMSK) address, the scanned conductance(closed equals 1) of key matrix cross-points of the keyboard switches in normal scanning sequence, or the value of a particular digit scanner state, for example, D11.

The carry-borrow and FLAG inputs to the condition circuit provide means for convenient branch operations whereby the sequential program execution can be made dependent on results of data, on arithmetic register operations, and on the current status of the calculator system as indicated by any of a plurality of status memories (FLAGs) as for example in the illustrated embodiment in which 26 FLAGs are available.

The key matrix and digit scanner inputs to the condition circuit provide means for convenient and efficient synchronization and encoding under program control of a plurality of keyboard inputs, as for example in the present illustrated embodiment, 44 inputs are available. TABLE IV of U.S. Pat. No. 4,074,351 shows the coding and operation of these instructions. The WAIT operations provide control means to recirculate program counter (PC) 209 at its current value (not incremented) until the WAIT condition (D11, KN, or KP) is satisfied. In addition, a register operation which subtracts the numeral 1 from the mantissa of A register 211 can be associated with the D11 WAIT condition and is associated with the KN and KP WAIT condition instructions. The logical shift and FLAG initialization instructions are also shown in TABLE IV.

TIMING BLOCK 203

Figure 6:
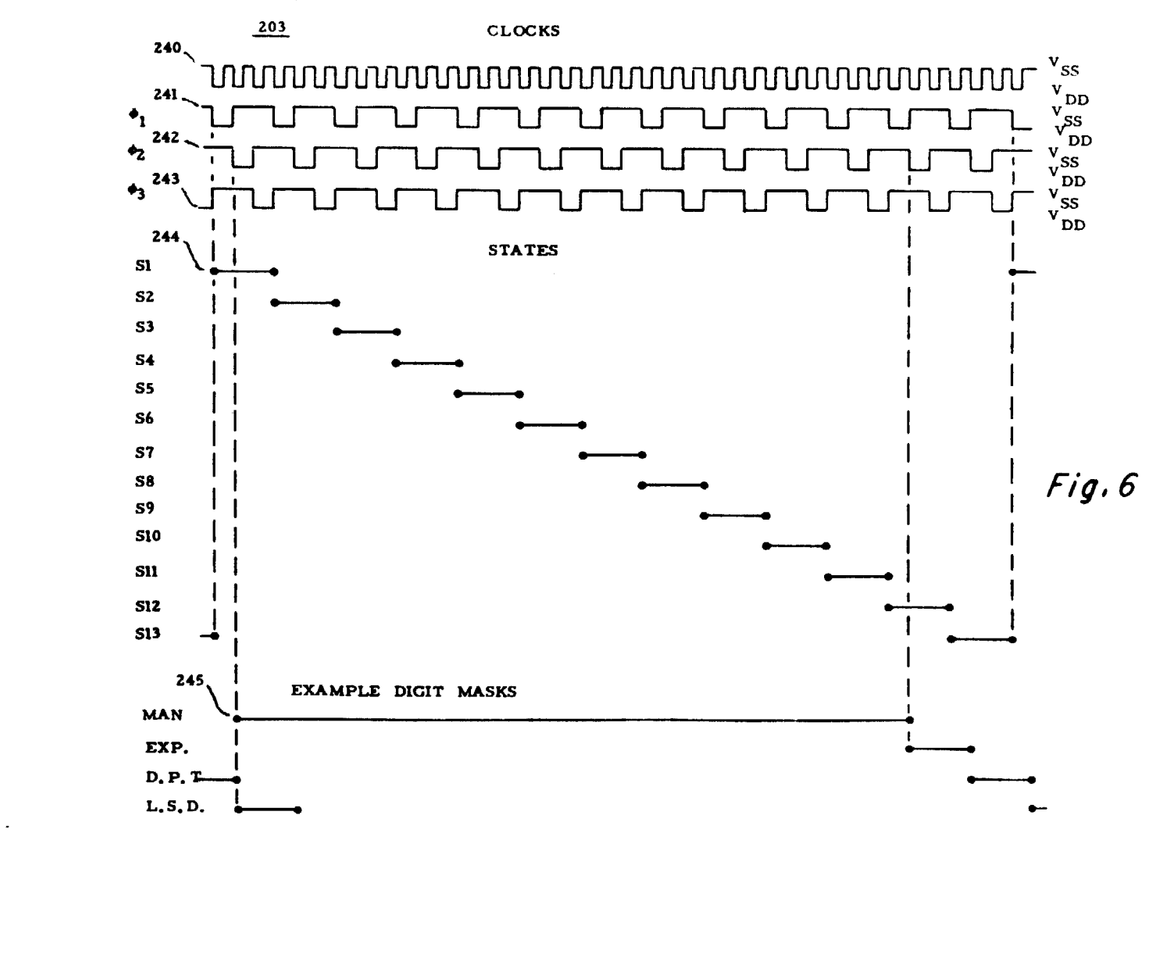
FIG. 6 is a graph illustrating the basic instruction cycle timing for the calculator system.

The function of the subsystem within timing block 203 is to generate three phase internal clocking (internal being within the monolithic structure of the preferred MOS embodiment) from an external single phase oscillator voltage, generate internal state and digital timing based upon the clocking inputs and provide digit and FLAG masking decoders. The basic instruction cycle timing for the calculator is illustrated in FIG. 6. The ∅ system timing input 240 is a square wave provided by an oscillator with approximately 50% duty cycle. The 3 internal clocks $\phi_1$, $\phi_2$ and $\phi_3$ provide signals 241, 242 and 243, respectively, which are derived from the ∅ system clock by means of a recirculating ring counter. With binary coded decimal parallel arithmetic utilized in accordance with the present invention, each digit of add or subtract calculation utilizes one full set of clock pulses $\phi_1$, $\phi_2$, and $\phi_3$. The full set of clock pulses is considered a state; consider for example the first state S1 with a corresponding signal 244. There are 13 such states S1-S13 corresponding to the 13 digit circulation of registers 211-213 in data block 204. The 13 states are generated by means of a feedback shift counter. Although the 13 states and 13 digit registers will allow storage of 13-digit numbers, a generalized floating point notation which is more convenient from the standpoint of program storage and manipulation of data is utilized in accordance with the present invention. This is accomplished by the masking or sub-addressing registers 211-213 to mask or isolate 6 particular fields as follows; Mantissa field 245 which has N digits, the first of which is the least significant digit (LSD), the last of which is the overflow digit (OVF) and the (N-1)th digit of which is the most significant digit (MSD); masks are thus provided for the mantissa, the LSD, the MSD and the OVF. There is also provision for an exponent (EXP) mask and a display (DPT) mask. These 6 masks are generated in the digit mask decoder as commanded by the M mask field 232 of the instruction word. In accordance with the present invention, the masks are individually adjustable so that variable functioning systems can be accommodated within the calculator system. In the MOS embodiment, variations of the masks are effected by varying the gate oxide mask during the fabrication process to change the calculator operation. One variation for example, would be to set up one or more of the 6 masks to cover two digits and controlling the adder circuit in the data block to operate in hexadecimal as opposed to binary coded decimal thereby allowing for the processing of 8-bit binary characters by the calculator system.

In addition to the digit mask provisions, a subsystem of timing block 203 controls the addressing of FLAGS. The addressing of FLAGs is essentially a one out of thirteen selection and is accomplished by the FLAG mask decoder.

Figure 7:
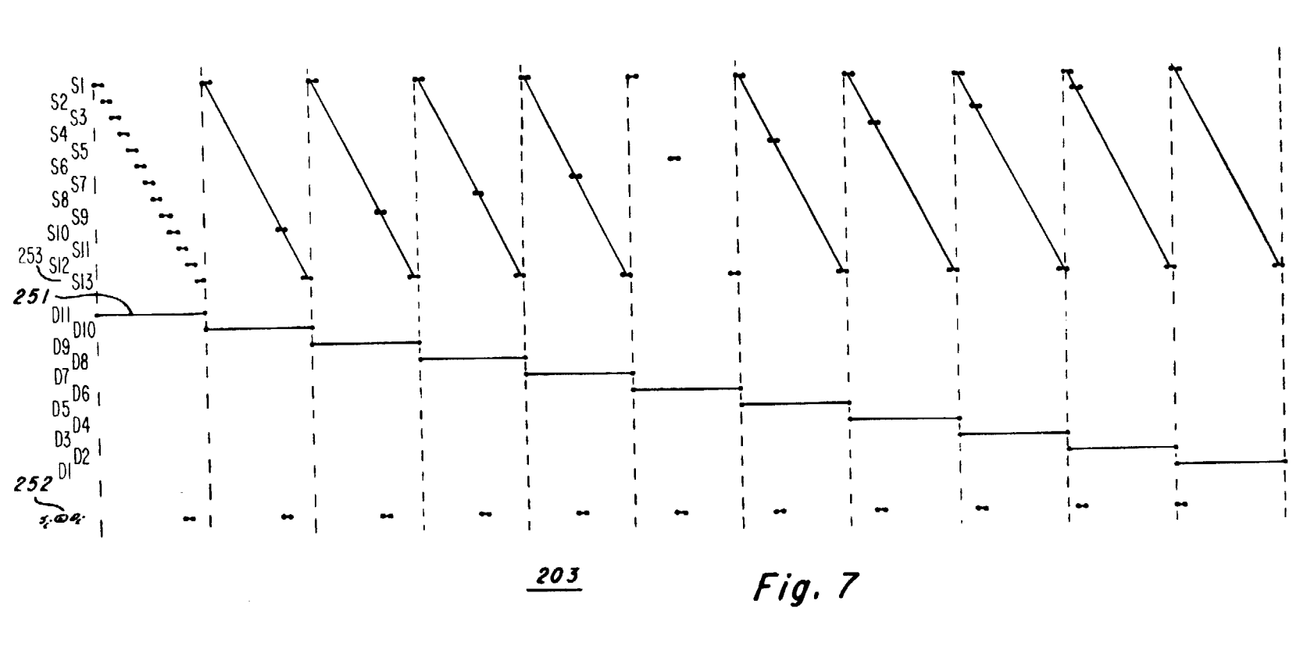
FIG. 7 is a graph representing the scan cycle timing for the keyboard and display scan and relates the scan cycle to the instruction cycle timing period.

FIG. 7 illustrates the scan cycle timing for the keyboard and display scan and relates the scan cycle to the instruction cycle timing period. In accordance with the present embodiment of the invention both the keyboard inputs and display outputs are scanned with the same scan signals. In this manner, the number of pins required to package the system as a monolithic integrated semiconductor structure are reduced to a minimum and the internal system logic is simplified. It is desirable to scan at a rate which is slow enough to be consistent with conventional displays such as a neon tube display in addition to, for example, a liquid crystal display and simultaneously to calculate at a very high rate. Hence, the scanner of the present invention operates by nesting multiple instruction cycles within a scan cycle. In the illustrated embodiment there are 11 scan signals which are sufficient for a 10 digit numeric display plus a 1 digit control display such as an error (E) signal or minus (—) sign. This also allows very efficient coding of the keyboard entry routine. During each digit time, for example, D11 with logic 1 signal 251, 1 digit of a particular register is synchronously decoded. In order to retrieve the various digits of a particular register in sequence the output decoder is double buffered. The input of the buffer is clocked on the state 252 which corresponds to the (equivalence: $S_i \cdot D_i$). The output is clocked on a fixed state, for example, signal 253 of state S13, synchronous with the digit scan cycle. In this manner, during a digit scan cycle, each digit from the registers is recovered in sequence and synchronously displayed. The digit counter is itself clocked by a particular state, for example, state S13 and operated by a feedback shift counter similar to the state feedback shift counter. In the present embodiment, the digit feedback shift counter counts down modulo 11 whereas the state counter counts up modulo 13. In this manner the real-time most-significant-first scan which results provides means for implementation of zero suppression logic in the display.

Figure 8:
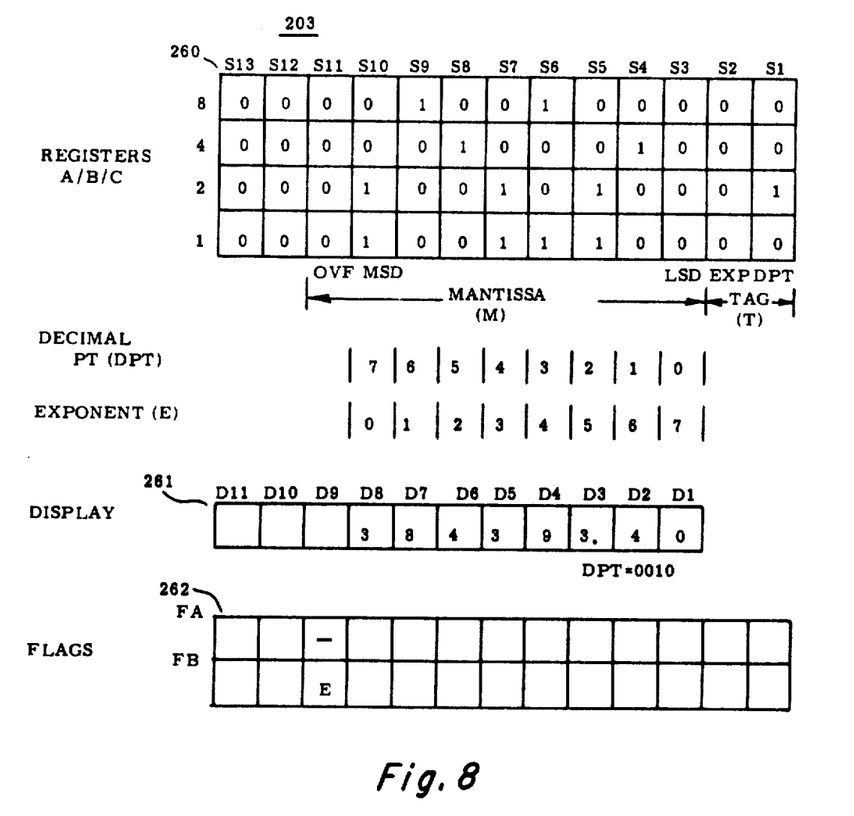
FIG. 8 is a representation of the data format for the A register, B register, C register, FA FLAG register, FB FLAG register and display.

The exemplified digit masks discussed with respect to FIG. 6 are further clarified in FIG. 8. FIG. 8 illustrates the data format for A register 211, B register 212, C register 213, FA FLAG storage element 226, FB FLAG storage element 227, and the display. A numeric example is shown in the register format 260 in order to clarify the operation of the digit masks. In the example, the decimal points (DPT) is shown equal to 2. Therefore, in display format 261, the decimal appears at the $D_3$ location. The mantissa field is shown in the example for an 8 digit calculator system to exist between S11 and S3.

Although there is no rigid requirement for the FLAG format 262, in the present embodiment it is convenient to dedicate FA FLAG storage element 226 and FB FLAG storage element at S11 mask or time-address to storage of the minus (−) and error (E) FLAGS for the display. In this manner the logic of segment decoder 198 and hence of output block 205 is greatly simplified.

Finally, the subsystem of timing block 203 includes the key input logic. The function performed by this logic is buffering and synchronization to the internal instruction cycle. In accordance with the present calculator system no provision need be made in hardware to defeat transient noise, mechanical key bounce or double key entry; each of these functions are included as fixed program routines.

PROGRAM BLOCK 201

As illustrated in FIG. 2, the subsystem of program block 201 is comprised of read only memory (ROM) 208 and program counter (PC) 209. Read only memory 208 functions as a storage means for a linear program list which in the present embodiment contains 320 11-bit instruction words to provide the fixed programs which perform the particular calculator functions. Various embodiments of the calculator system are therefore provided by providing various combinations of programs in read only memory 208. Read only memory 208 may be programmed in accordance with the techniques described in U.S. Pat. No. 3,541,543 to R. H. Crawford et al, titled Binary Decoder. The programs may include keyboard input routines, internal format routines, internal calculation routines and display format routines. Specific programs utilized in conjunction with the desk top calculator function of the calculator system of the invention and the programming of the calculator system to perform other functions are described in a later section.

Program counter 209 is, in the present embodiment, a 9-bit dynamic storage register which accepts a new input during each instruction cycle. The new input is either the program count itself, the program count incremented by 1 or 9-bits from the previous instruction word. These three inputs provide WAIT instructions, normal operating instructions and jump instructions, respectively.

Figure 9:
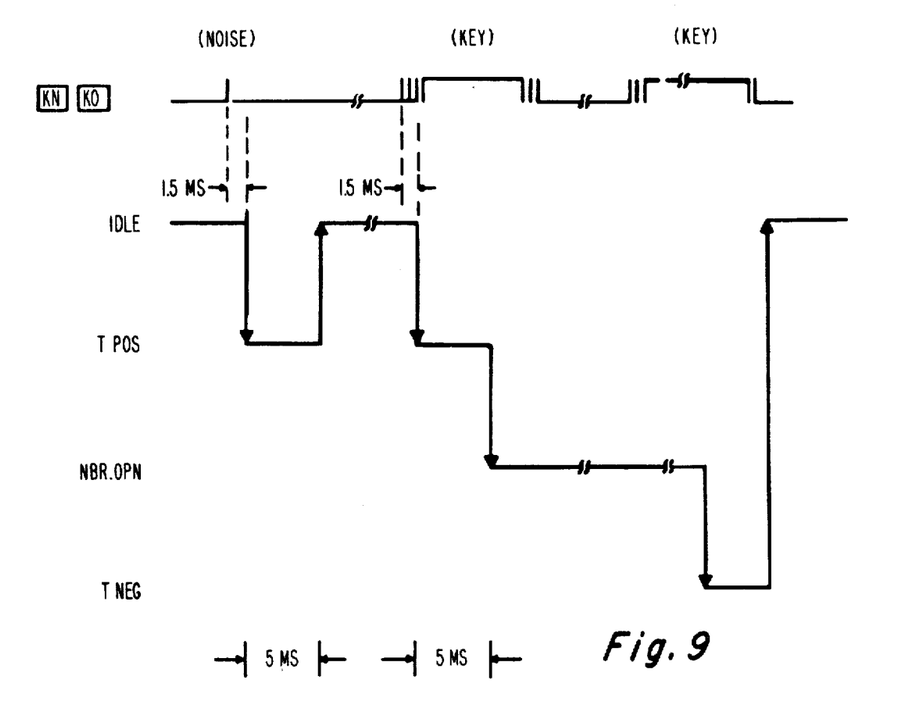
FIG. 9 is a graph representing the keyboard program timing showing that the input-sensing program provides protection against transient noise, double-entry, leading-edge bounce and trailing-edge bounce.

One function of program block 201 is to provide a defeat mechanism by which malfunction of the keyboard encoding procedure is prevented. The input-sensing program provides protection against transient noise, double-entry, leading-edge bounce, and trailing-edge bounce, as shown in FIG. 9. An 'IDLE' routine sequentially scans the [KO], [KN] and [KQ] inputs until a non-quiescent input is detected. The input is sampled again 2.5 ms later by a "TPOS" routine to distinguish a valid key-push from the transient noise. If the test is positive, then (5 ms after the initial detection) the program jumps to a 'NBR' or 'OPEN' entry routine; otherwise, it returns to the 'IDLE' routine. The 'NBR' routine enters the number which is keyed-in into the display register; 'OPN' performs the keyed-in operation. Both routines terminate in a jump to a 'TNEG' routine. 'TNEG' performs a scan of the [KN], [KO] and [KQ] inputs to determine that the entire keyboard is in its quiescent condition. After a successful (negative) test the program jumps back to the 'IDLE' routine.

Figure 10:
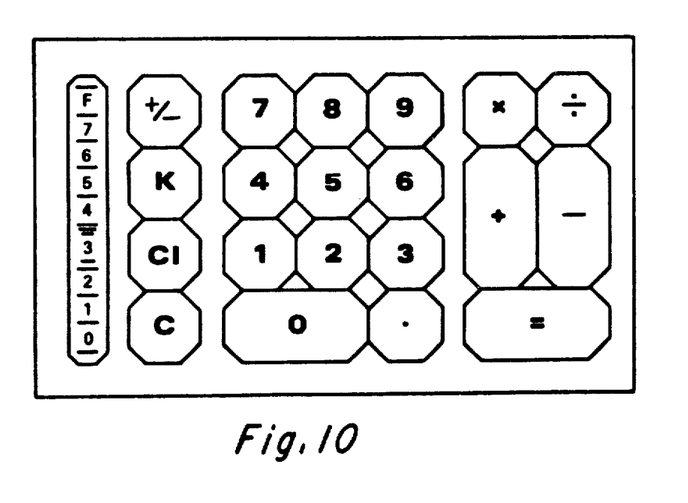
FIG. 10 and 11 are planar diagrams showing exemplary calculator keyboards utilized in conjunction with the present calculator system.
Figure 11:
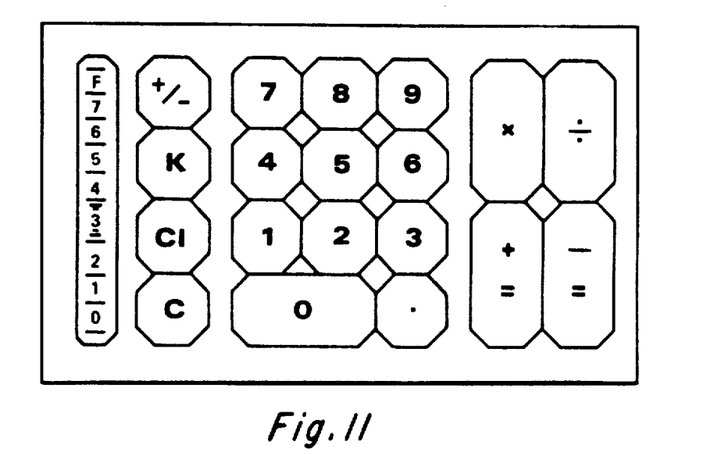

Five classes of keyboard inputs and consequent program routines are utilized in order to perform calculations and/or logic functions with the Calculator System, as follows: Number Keys, Mode Switches, A Decimal Point Switch, Operation Keys, and Interlock Keys. The distinctions between "keys" and "switches" is that keys are operated momentarily and exclusively, whereas switches are generally static and may have a normally-closed position. The program classes are explained by way of example; exemplary Calculator Keyboards using these keys are shown in FIGS. 10 and 11.

Number Keys: There are ten numeric keys and a decimal point key. Operation of the [0], [1], [2], [3], [4], [5], [6], [7], [8], and [9] keys left-shifts the display register one digit and enters the corresponding number into the least-significant digit. The [·] key is operated in normal sequence of figure entry. If it is not used, the point is assumed to be after the last numeric entered. The entry mode is always floating.

Mode Switches: The constant switch [K] selects between chain operation and constant operation. Normal operation of the calculator, with the constant key [K] up (open) allows chained calculations without loss of intermediate results. Alternative operation with [K] down (closed) allows constant operand operation.

Point Switch: Floating or fixed mode of operations is selected by an 11-position switch [F]-[9]-[8]-[7]-[6]-[5]-[4]-[3]-[2]-[1]-[0]. Positions [0] through [9] are used for fixed-point calculation results; the [F] position selects full-floating operation.

Operation Keys: With 10 Number Keys, 2 Mode Switches, 11-position Point Switch, and 44 Matrix Crosspoints, there remains space for a total of 21 possible operation keys. These key locations are sufficient to include the two main keyboard configurations illustrated in FIGS. 10 and 11. [+] Stores an addition command and performs a possible preceding operation; [−] stores a subtraction command and performs a possible preceding operation; [X] stores a multiplication command and performs a possible preceding operation; [÷] stores a division command and performs a possible preceding operation; [+/−] changes the sign of the display register; [=] performs the preceding operation and stores a command to clear at the next number entered; [=] enters the last keyed-in number in the calculator and performs a possible preceding operation; [=] enters the last keyed-in number in the machine as a negative number; [C] clears all three registers and any preceding operation; [CI] clears the display register.

Interlock Key routines are functional hybrids of (momentary) operation keys and (static) mode switches. They provide a mechanism for interlocking the operation of the Calculator System to the operation of other devices. In particular, the Calculator System may be programmed for at least three additional types of applications by the operation of Interlock Key routines, as follows: the Calculator System (master) controlling of a Slave Device (e.g., print mechanism or print control circuit); slave operation of the Calculator System by a Master Device (e.g., a remote controller through a real-time communication medium); and multiprocessing by a plurality of Calculator Systems of the present invention according to a preprogrammed interlock routine for determination of priority and effecting of intercommunication.

OUTPUT BLOCK 205

In the described embodiment of the Calculator System, twenty-two outputs are provided to perform display and keyboard scanning, and synchronously decode the contents of the display register.

Figure 12:
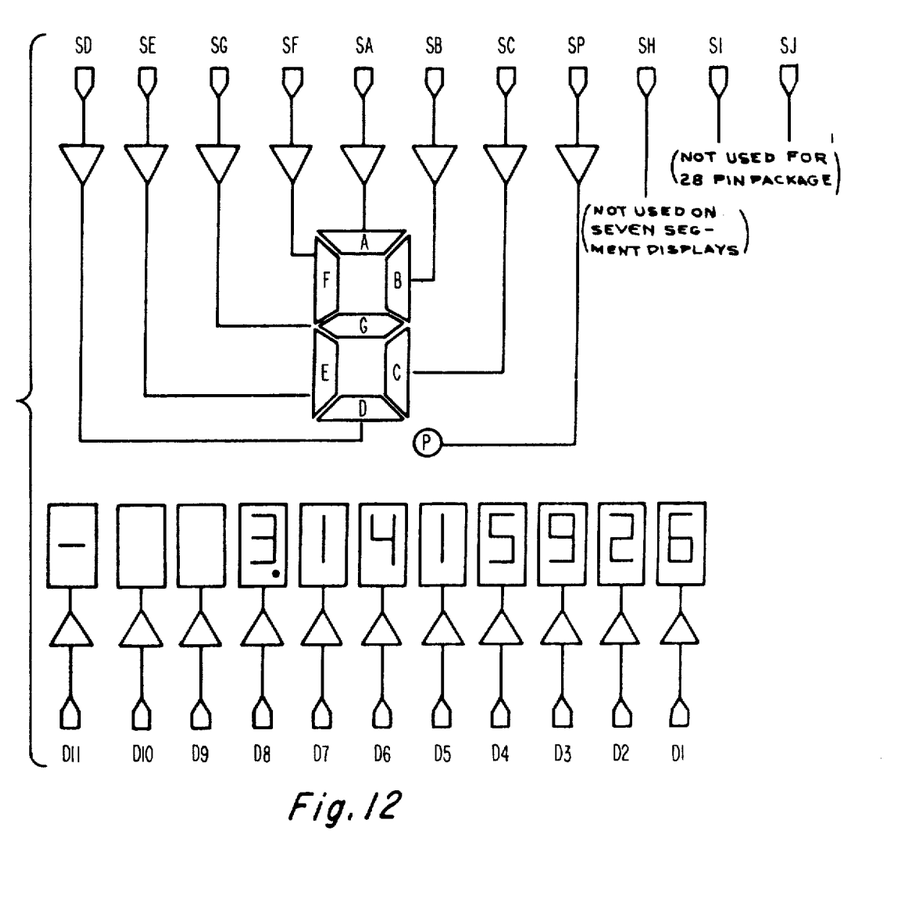
FIG. 12 is a circuit diagram of the display element showing the input and output connections to the digit scanning circuits.

Referring to FIG. 12, the Digit Driver (D1, D2, D3, D4, D5, D6, D7, D8, D9, D10, D11) outputs of digit decoder 195 are used to scan-encode the keyboard and to scan the display. An inter-digit blanking signal is gate-mask programmed to disable the digit drivers for interface to particular display devices. The polarity of the digit signals is positive; that is, during Di, Di is conducting to VSS. This is provided in the described MOS calculator system embodiment in order to effectively scan the keyboard matrix.

The Segment Driver (SA, SB, SC, SD, SE, SF, SG, SH, SI, SJ, SP) outputs of the segment decoder 198 are gate-mask programmed for direct compatibility with 7- and 8-segment (plus decimal point) displays. In addition to segment code, both inter-digit blanking and segment polarity can be selected. Thus, the inter-digit blanking signal is programmable in increments of 12 microseconds (nominal); and it can be applied to either digit drivers or segments drivers, or both. The leading zeros (high-order zeros before the decimal point or a non-zero figure) are supressed by disabling all segment drivers.

Figure 13:
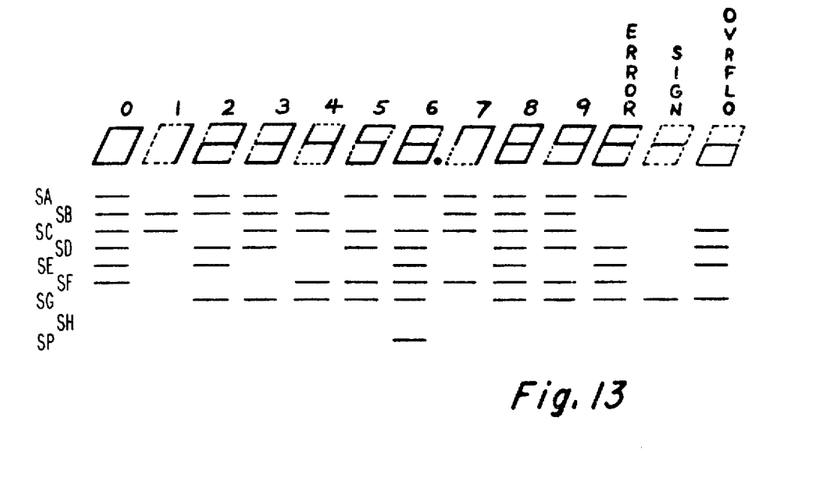
FIG. 13 is a diagram showing a representative display font of a display utilized in conjunction with an embodiment of the present invention.
Figure 14:
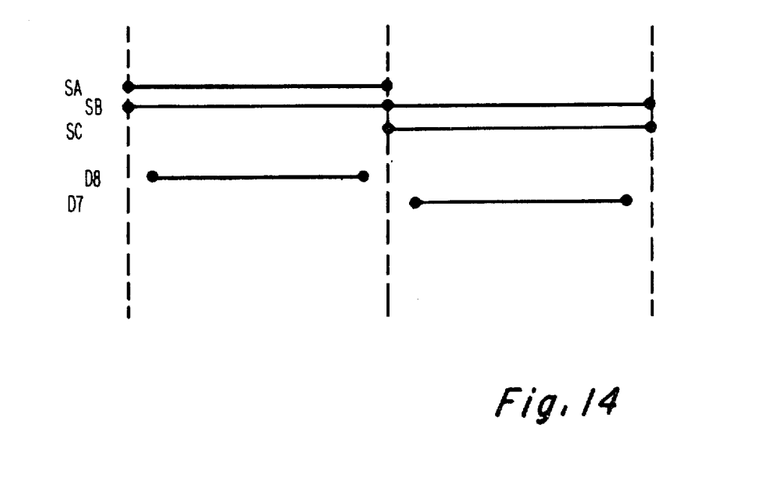
FIG. 14 is a graph showing how the segment drive includes the digit drive of an embodiment of the invention.
Figure 15:
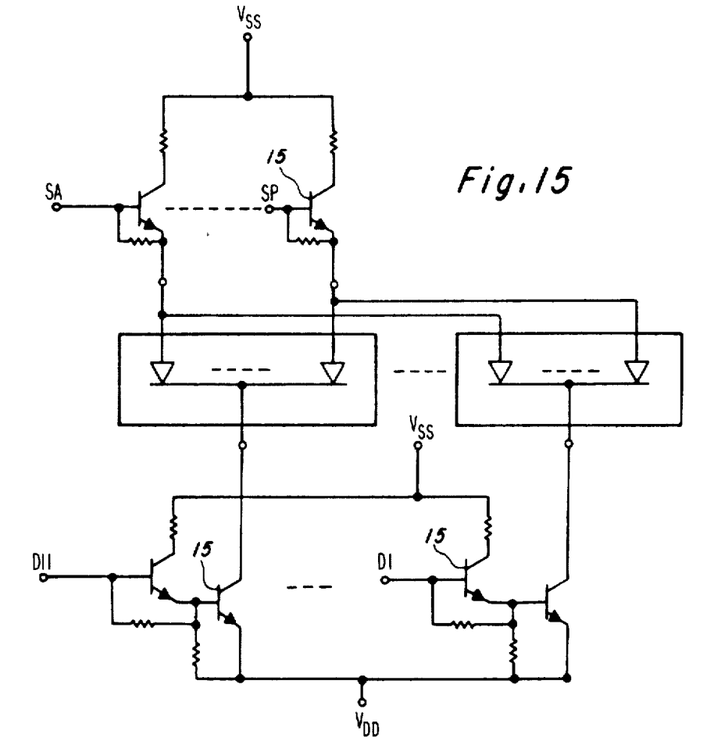
FIG. 15 is a circuit diagram of an interface circuit between the display elements and the scanning circuits in an embodiment of the present invention.

The described Calculator System embodiment digit and segment decoders have been programmed for a 7-bar digit-blanked characteristic with positive segment decoding (segment A "on" is decoded as SA conducting to VSS). The display font is illustrated in FIG. 13. The complete coding of the numerals, error (E) and minus (−) indications are shown. SH is not used for display but outputs information useful for testing purposes. SI and SJ are available in hardware for use with numeric displays with one terminal (e.g., cathode) per numeral. However, these outputs are not used for segmented displays in order to allow the monolithic integrated semiconductor embodiment of the Calculator System to be placed in a 28-pin packaging. When a clock period is 4 microseconds, for example, the scan rate is 156 microseconds per digit. For example, the present embodiment is programmed for 12-microsecond leading-edge blanking and 12-microsecond trailing-edge blanking on the digit drivers only. Hence, the segment drive covers the digit drive, as illustrated in FIG. 14. An interface circuit which includes bi-polar transistors 15 for a common-cathode 7-bar LED display is shown in FIG. 15. The interface circuit of the present embodiment is fabricated on a separate semiconductor substrate.

Figure 16:
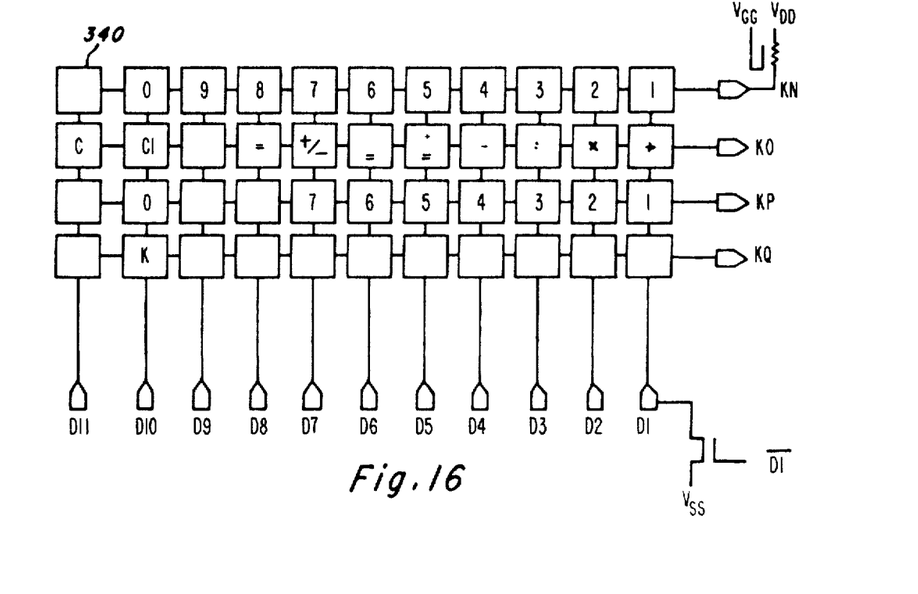
FIG. 16 is a circuit representation of a keyboard utilized in conjunction with the described calculator embodiment including the interconnections to the scanning circuits.

FIG. 16 illustrates the key assignment of the described calculator embodiment. Each key, e.g., 340 is a Form A normally open single pole, single throw switch, which has meaning for the particular input routine programmed in ROM 208.

It is also contemplated that some of the "Mode Switches" discussed previously in the Program Block section could in some embodiments be in the form of jumper wires, thus more permanently selecting a particular mode for a particular model or family of equipment. In this way, a "master program" involving a single embodiment of the invention could economically and feasibly cover the whole family of distinct operational characteristics.

LOGIC AND CIRCUIT DESCRIPTION OF THE MOS CALCULATOR SYSTEM EMBODIMENT

The calculator system according to the present invention has been discussed in terms of the function within each block of FIGS. 1 and 2. In the U.S. Pat. No. 4,074,351 (incorporated herein by reference), assigned to the assignee of this application and having the same parent application Ser. No. 163,565, the calculator system is described in terms of logic system and circuit elements which comprise the present calculator system embodiment which as previously noted is capable of being fabricated as a monolithic integrated semiconductor system utilizing contemporary MOS or MIS manufacturing technology. The complete calculator system of the present embodiment except for the keyboard illustrated separately in FIG. 16, the display element shown separately in FIGS. 12-14 and the display driver illustrated separately in FIG. 15, is shown in detail in a logic/circuit diagram and ROM programs therefor in U.S. Pat. No. 4,074,351 which is incorporated herein by reference.

Figure 17:
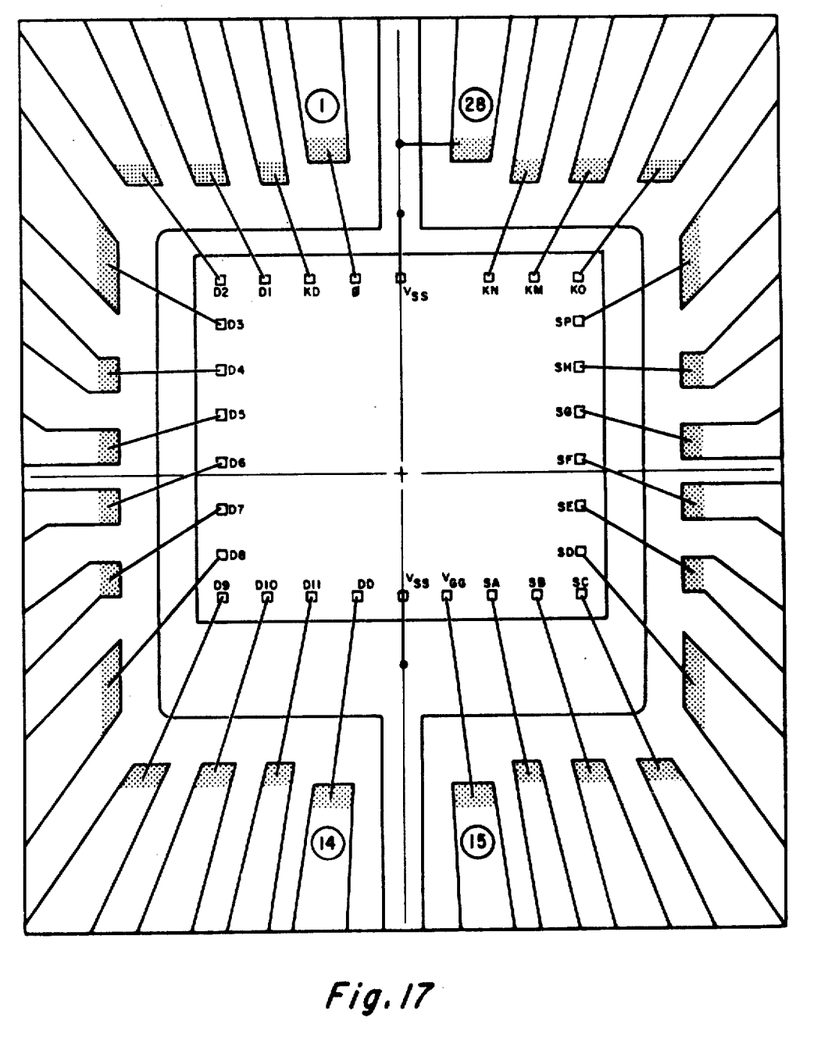
FIG. 17 is a planar view of the packaged monolithic structure showing terminal interconnects to the keyboard, display drivers and power supply.

FIG. 17 illustrates the physical relationship between the above described signals and functions of the present embodiment and the packaging techniques of contemporary integrated circuit technology. For example, the input/output terminals of the present embodiment can be connected to a ceramic or plastic package lead frame using wire conductors and thermal compression bonding to provide means for allowing the system to become more accessible to conventional DIP/printed circuit board handling and usage.

In the described MOS embodiment of the calculator system of the invention, $V_{SS}-V_{DD}$ and $V_{DD}-V_{GG}$ are for example, nominally 7.2 volts under normal operating conditions (8.1 volts maximum; 6.6 volts minimum). The clock ($\phi$) frequency is nominally 250 KHz, minimum 200 KHz and maximum 330 KHz.

PROGRAMMING OF THE CALCULATOR SYSTEM FOR NON-CALCULATOR FUNCTIONS

The calculator system of the present invention is a variable function calculator system in that it may be programmed to perform functions other than the desk top calculator functions previously described. The variable functionability of the system is essentially provided by the programmability of various subsystems such as the programmable read-only memory and the programmable logic arrays utilized in the system. As previously stated, these programmable subsystems are programmed during the fabrication of MOS or MIS embodiments by merely modifying the gate-insulator mask.

In further calculator embodiments, a large number of diverse functions utilizing additional keys on a keyboard and/or additional programs stored in the ROM could provide a system including, for example, right shift, exchange operand, square root, exponential operations, logarithmic operations, double and triple zero operation, and key sequence recognition.

Being that the calculator system of the invention includes program control, data control arithmetic and logic means and input/output subsystems in various embodiments the system may be programmed to perform non-calculator functions. For example, the calculator system may be programmed to perform meter functions such as for a digital volt meter, event counting, meter smoothing, taxi-fare meter, an odometer, scale meter to measure weight, etc. The system may also be programmed to perform cash register operations, act as a controller, arithmetic teaching unit, clock, display decoder, automobile rally computer, etc.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

What is claimed is:

1. A data processing system implemented in a large-scale-integrated semiconductor device employing insulated gate field effect transistors, comprising:
   (a) a word-addressable read-only-memory array for storing fixed instruction words to control the operation of the system, the read-only-memory array being programmable in manufacture to provide a variety of different functions for systems made with said device of the same construction except for the fixed instruction words;
   (b) control means connected to the read-only-memory to receive the instruction words and generate command signals;
   (c) addressing means including a register coupled to said read-only-memory array for addressing the read-only-memory array to provide a sequence of instruction words for operating said system, each address of the register representing a different instruction word;
   (d) data storage means including an array of read/write memory cells defining a plurality of memory locations for storing in bit-parallel format a plurality of multi-bit words of information;
   (e) bit-parallel arithmetic-logic means coupled to said control means to receive command signals and coupled to said data storage means for receiving multi-bit words from the data storage means and performing arithmetic and logic operations on said multi-bit words in accordance with the command signals to provide resulting outputs;
   (f) means coupled to said data storage means and to the arithmetic-logic means and controlled by command signals from said control means for inputing selected words of said information into the arithmetic-logic means from defined memory locations in said data storage means and coupling the resulting outputs from the arithmetic-logic means to defined locations in the data storage means.

2. An electronic system comprising a monolithic integrated semiconductor unit having:
   (a) addressable storage means including a semiconductor read-only-memory for storing fixed program instructions to control the operation of the system, said read-only-memory being programmable in a fixed manner to store particular program instructions to define the specific functions of the system as selected from a variety of different functions available for the system;
   (b) control means including decoder means coupled to an output of said addressable storage means and responsive to said program instructions for generating control signals in accordance with said program instructions;
   (c) data memory means including a plurality of locations for storing a plurality of multibit data words of information in bit-parallel format; the data memory means including an array of rows and columns of read/write memory cells;
   (d) bit-parallel arithmetic-logic means connected to the control means to receive control signals and having an input for receiving data words from the memory means, the arithmetic-logic means performing bit-parallel arithmetic and logic operations on said data words and producing an output, one word at a time, in accordance with said control signals; and
   (e) selector means connected to the control means to receive control signals, said selector means coupling said data memory means to the input of the arithmetic logic means and coupling the output of the arithmetic logic means to the data memory means, selectively in accordance with said control signals.

* * * * *